United States Patent
Sjursen et al.

(10) Patent No.: US 12,254,313 B2
(45) Date of Patent: Mar. 18, 2025

(54) CONTEXTUALIZATION OF CODE DEVELOPMENT

(71) Applicant: Microsoft Technology Licensing, LLC, Redmond, WA (US)

(72) Inventors: Bjarte Sjursen, Tromso (NO); Dino Ilić, Oslo (NO); Yiran Liu, Toronto (CA); Zhengyuan Liu, Toronto (CA); Fatma Mohamed Ali, Nairobi (KE); Tudor Marius Popa, Sibiu (RO); Victor Manuel Garcia Rosales, Guadalajara (MX)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 17/836,267

(22) Filed: Jun. 9, 2022

(65) Prior Publication Data
US 2023/0401055 A1   Dec. 14, 2023

(51) Int. Cl.
*G06F 9/44*   (2018.01)
*G06F 8/10*   (2018.01)
(Continued)

(52) U.S. Cl.
CPC .................. *G06F 8/71* (2013.01); *G06F 8/10* (2013.01); *G06F 16/9535* (2019.01); *G06F 16/9538* (2019.01); *G06F 16/955* (2019.01)

(58) Field of Classification Search
CPC ..... G06F 8/71; G06F 8/73; G06F 8/10; G06F 16/955; G06F 16/9535; G06F 16/338; G06F 16/335; G06F 16/3334
See application file for complete search history.

(56) References Cited

U.S. PATENT DOCUMENTS

| 6,735,578 B2 | 5/2004 | Shetty et al. |
| 10,108,526 B2 | 10/2018 | Sisman et al. |

(Continued)

FOREIGN PATENT DOCUMENTS

| CN | 110990055 A | * | 4/2020 | ............... G06F 8/70 |
| CN | 113190269 A | * | 7/2021 | |

OTHER PUBLICATIONS

Majid Hatamian, Engineering Privacy in Smartphone Apps: A Technical Guideline Catalog for App Developers, 2020, pp. 35429-35444. https://ieeexplore.ieee.org/stamp/stamp.jsp?tp=&arnumber=9001128 (Year: 2020).*

(Continued)

*Primary Examiner* — Mongbao Nguyen
(74) *Attorney, Agent, or Firm* — NovoTechIP International PLLC

(57) ABSTRACT

The disclosed technology is generally directed to code transparency. In one example of the technology, raw input data that includes version information that is associated with code is received. The version information includes pull requests associated with the code. Extracted key phrases are provided by performing a key-phrase extraction on the raw input data. A list of documents and a list of people are determined based at least in part on the extracted key phrases. A relevance ranking is performed on the list of documents and the list of people. Based on the relevance ranking, relevant documents and relevant people are determined, such that the relevant documents and the relevant people are relevant to the code. To a developer environment that is associated with the code, information associated with the relevant documents and/or the relevant people is provided.

15 Claims, 5 Drawing Sheets

(51) Int. Cl.
  *G06F 8/71* (2018.01)
  *G06F 9/445* (2018.01)
  *G06F 9/455* (2018.01)
  *G06F 16/9535* (2019.01)
  *G06F 16/9538* (2019.01)
  *G06F 16/955* (2019.01)

(56) References Cited

U.S. PATENT DOCUMENTS

| | | | |
|---|---|---|---|
| 2013/0124193 A1 | 5/2013 | Holmberg | |
| 2020/0042648 A1* | 2/2020 | Rao | G06F 16/2457 |
| 2020/0133441 A1* | 4/2020 | Smith | G06F 16/2246 |
| 2021/0019141 A1* | 1/2021 | Marsnik | G06N 7/01 |
| 2021/0049206 A1 | 2/2021 | Lydia et al. | |
| 2021/0081182 A1* | 3/2021 | Seshadri | G06F 8/73 |
| 2021/0132913 A1* | 5/2021 | Singh | G06F 8/33 |
| 2021/0294809 A1* | 9/2021 | Helvik | G06F 16/9538 |
| 2021/0303638 A1* | 9/2021 | Zhong | G06F 40/169 |
| 2021/0374649 A1* | 12/2021 | Haldar | G06Q 10/063112 |
| 2021/0406000 A1* | 12/2021 | Owen | G06F 11/3688 |
| 2022/0043779 A1* | 2/2022 | Maddila | G06F 40/197 |
| 2022/0236697 A1* | 7/2022 | Stump | G06F 8/71 |
| 2022/0277270 A1* | 9/2022 | Balasubramanian | G06F 8/77 |
| 2022/0309418 A1* | 9/2022 | Chivukula | G06F 8/71 |
| 2022/0334837 A1* | 10/2022 | Sa | G06F 8/34 |
| 2022/0350595 A1* | 11/2022 | Liu | G06F 9/451 |

OTHER PUBLICATIONS

Luca Ponzanelli, Supporting Software Developers with a Holistic Recommender System, 2017, pp. 1-12. https://ieeexplore.ieee.org/stamp/stamp.jsp?tp=&arnumber=7985653 (Year: 2017).*

Zhiyuan Wan, Predicting Code Context Models for Software Development Tasks, 2020, pp. 1-12. https://xin-xia.github.io/publication/ase201.pdf (Year: 2020).*

Luca Ponzanell, Supporting Software Developers with a Holistic Recommender System, 2017, pp. 94-103. https://ieeexplore.ieee.org/stamp/stamp.jsp?tp=&arnumber=7985653 (Year: 2017) (Year: 2017).*

English translation, Zhang (CN 113190269 A), 2021, pp. 1-9. (Year: 2021).*

Begel, et al., "Codebook: Discovering and Exploiting Relationships in Software Repositories", In Proceedings of the 32nd ACM/IEEE International Conference on Software Engineering, May 2, 2010, pp. 125-134.

Maddila, et al., "Nalanda: A Socio-Technical Graph for Building Software Analytics Tools at Enterprise Scale", In repository of arXiv:2110.08403v3, Mar. 5, 2022, pp. 1-45.

"International Search Report and Written Opinion Issued in PCT Application No. PCT/US23/019036", Mailed Date: Jul. 11, 2023, 13 Pages.

"Application as Filed in U.S. Appl. No. 17/566,805", filed Dec. 31, 2021, 60 Pages.

Alomar, et al., "On the Documentation of Refactoring Types", In Journal of Automated Software Engineering, vol. 29, Issue 1, Dec. 29, 2021, 37 Pages.

Mansour, Ali, "Four of the Easiest and Most Effective Methods to Extract Keywords from a Single Text using Python", Retrieved From: https://www.analyticsvidhya.com/blog/2022/01/four-of-the-easiest-and-most-effective-methods-of-keyword-extraction-from-a-single-text-using-python/, Jan. 5, 2022, 5 Pages.

Pratico, et al., "Azure Text Analytics Client Library for Python", Retrieved From: https://github.com/Azure/azure-sdk-for-python/blob/d1af2b530ed0768932de62120c834321c488b1d9/sdk/textanalytics/azure-ai-textanalytics/README.md, Dec. 17, 2019, 16 Pages.

* cited by examiner

CONTEXTUALIZATION OF CODE DEVELOPMENT

BACKGROUND

Code development is an important aspect for many organizations. Collaboration in performing code development has become more prevalent. As such, it has become increasingly desirable in many cases for a viewer of code (e.g., a programmer, manager, tester) to understand the history and progression of the code and/or to understand what aspects of code a programmer has contributed to or worked on over a period of time. Manually reviewing such code aspects and communicating with developers can be tedious and time consuming. For example, a user may need to access various services to identify the desired information, including communication services to communicate with a developer, remote services that host a remote or global code repository to identify information associated with master code, etc. In addition to such manual tracking of information being tedious and time-consuming, such a manual process may also require and consume computing resources to navigate the systems and identify the desired information.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to code transparency. In some examples, raw input data that includes version information that is associated with code is received. In some examples, the version information includes a plurality of pull requests associated with the code. In some examples, a plurality of extracted key phrases is provided by performing a key-phrase extraction on the raw input data. In some examples, a list of documents and a list of people are determined based at least in part on the plurality of extracted key phrases. In some examples, a relevance ranking is performed on the list of documents and the list of people. In some examples, based on the relevance ranking, a plurality of relevant documents and a plurality of relevant people are determined, such that plurality of relevant documents and the plurality of relevant people are relevant to the code. In some examples, to a developer environment that is associated with the code, information associated with at least one of the plurality of relevant documents or the plurality of relevant people is provided.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
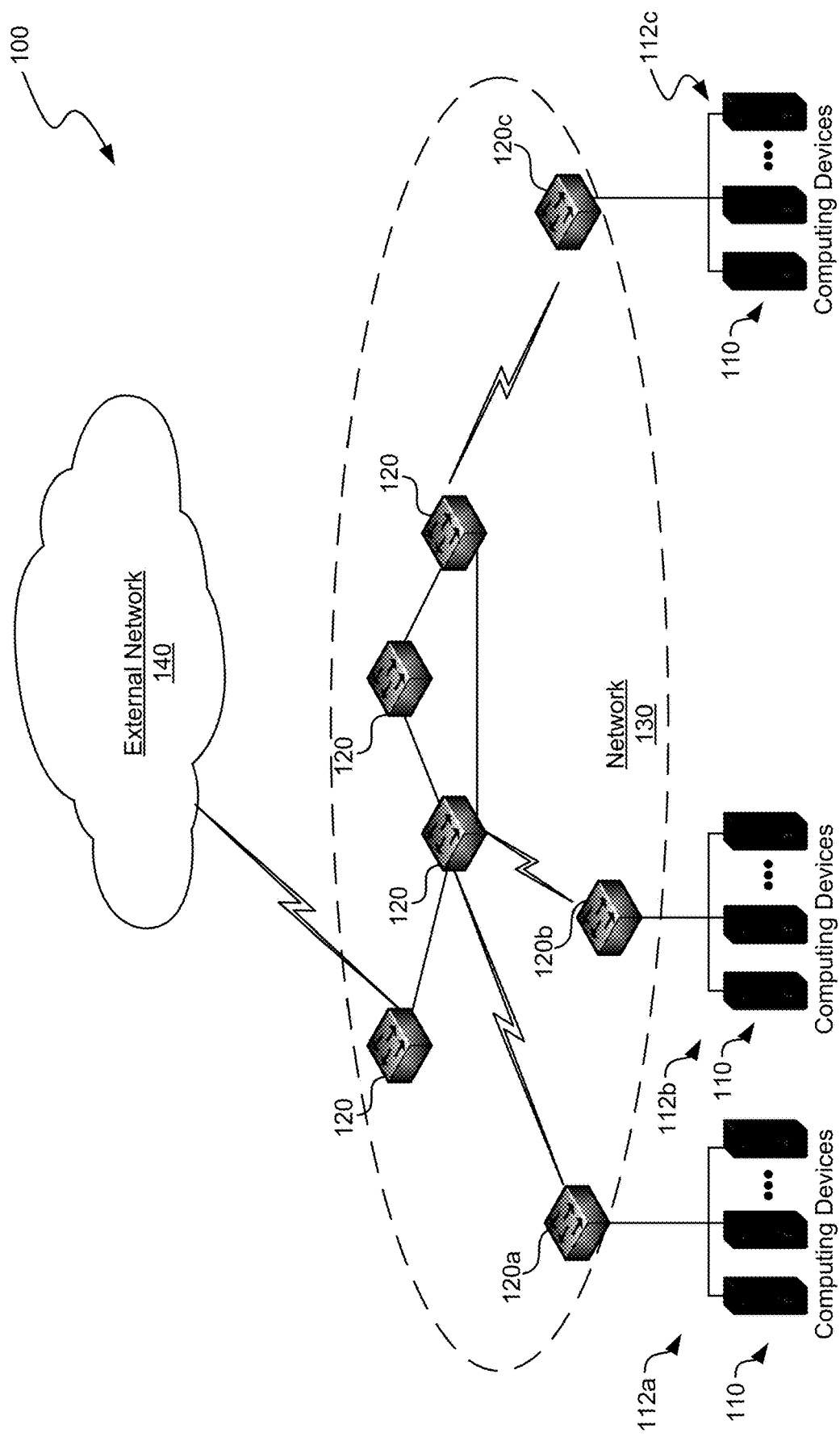
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks. The term "document" refers to a sequence of words, tokens, items, properties, or other suitable units of data, where the sequence is capable of being indexed and uniquely identified.

Briefly stated, the disclosed technology is generally directed to code transparency. In some examples, raw input data that includes version information that is associated with code is received. In some examples, the version information includes a plurality of pull requests associated with the code. In some examples, a plurality of extracted key phrases is provided by performing a key-phrase extraction on the raw input data. In some examples, a list of documents and a list of people are determined based at least in part on the plurality of extracted key phrases. In some examples, a relevance ranking is performed on the list of documents and the list of people. In some examples, based on the relevance ranking, a plurality of relevant documents and a plurality of relevant people are determined, such that plurality of relevant documents and the plurality of relevant people are relevant to the code. In some examples, to a developer environment that is associated with the code, information associated with at least one of the plurality of relevant documents or the plurality of relevant people is provided.

Code developers may often manage work being done on code with a repository that acts as a version control system. The repository may use a main branch that stores the main production code. Other work being done on the code that is not currently part of the main production code may be stored in separate branches. The separate branches may later be brought into the main branch through a review process. Changes to code in a branch, the creation of a new branch, or the merging of code in one branch to another branch may be accomplished by a pull request that includes one or more commits.

A code developer may view code in an integrated developer environment (IDE). When a portion of code is being viewed in the IDE, the IDE may provide additional contextualization information about the portion of the code that is being viewed. The contextualization answer may provide information that answers questions that developers might have about the portion of code, such as who made the code, how the portion of code was introduced, and/or the like.

The contextualization information may include documents and people that are relevant to the code. For example, the contextualization information may include people that contributed to the code including product manager and designers. The contextualization information may also include specification documents made by product managers and design files created by designers. The code developer may then be able to view the relevant documents and communicate with relevant people via an interface that is included in the IDE while the code developer is viewing the code portion in the IDE.

The relevant people and relevant documents may be determined by a contextualization engine based on version control data for the code that is stored in the repository. The version control data may include all of the pull requests for the code. The contextualization engine may use URL extraction to determine documents that were linked to in the pull requests. The contextualization may also use key-phrase extraction to extract key phrases from the version control data (including commit messages and/or pull requestion descriptions in the version control data), and use the extracted key phrases to find documents and people that might be relevant to the code. Relevant people may also be determined from the documents. The documents and people may then be ranked for relevancy so that people and documents relevant to the code can be determined.

This process may then be iterated again using the relevant document and people as inputs. That is, for example, URLs may be extracted from the relevant documents to documents that are linked to, and key-phrase extraction may be performed on the documents. The extracted key phrases may be used to determine people and documents that may be relevant to the code. People associated with the documents may be determined. The documents and people determined for this iteration may then be ranked for relevancy so that additional people and documents relevant to the code can be determined. The process may then be iterated again for the newly determined relevant people and documents, with the process iterating until relevant people and documents are no longer determined (or fail to reach a relevance threshold).

The relevant people and documents determined by the contextualization engine may then be provided to the IDE so that the relevant people and documents may be included among the contextualization information that is provided when a portion of code is viewed in the IDE.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including a local computer, on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/ or other suitable computing services.

In some examples, one or more of the computing devices 110 is a device that is configured to be at least part of a process for code contextualization.

Illustrative Computing Device

Figure 2:
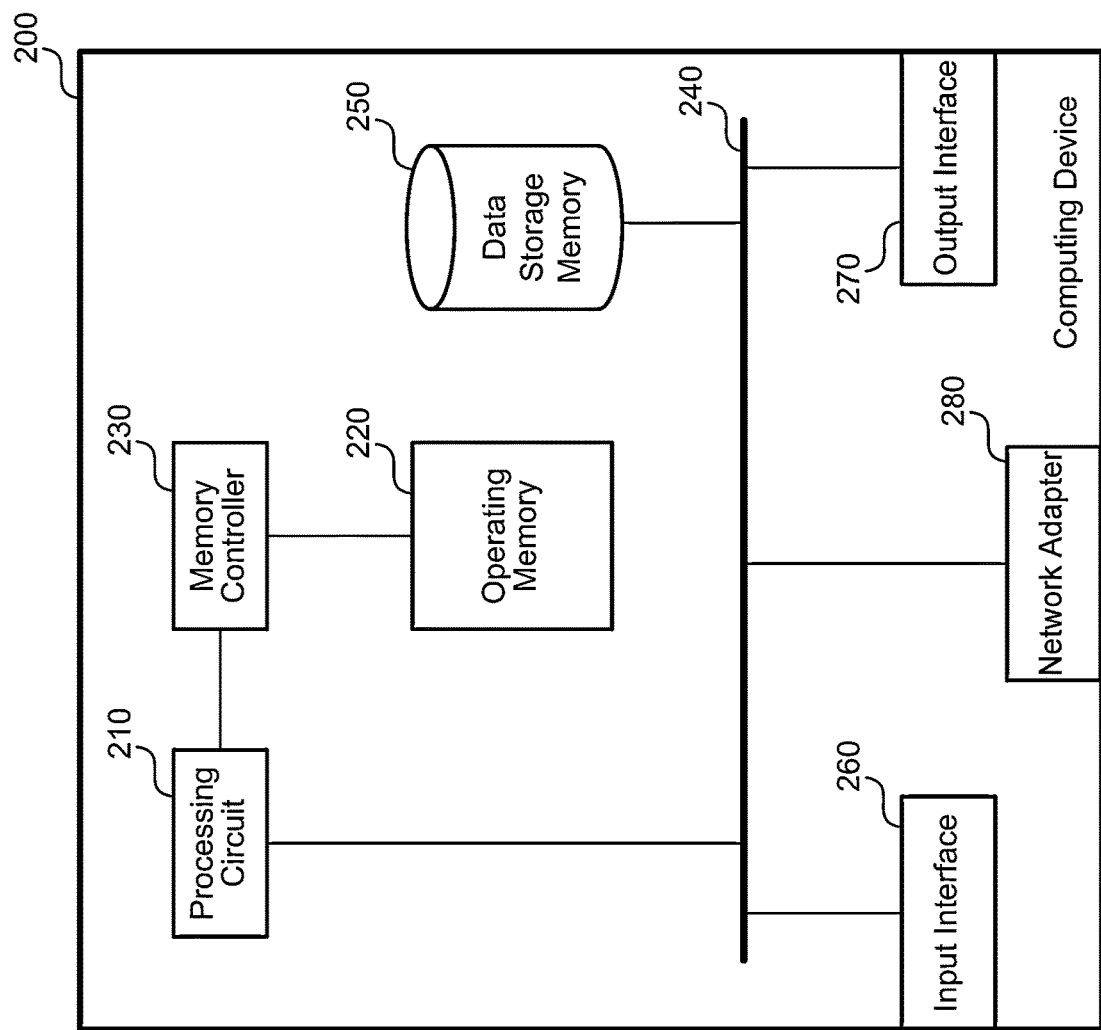
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device no or network node 120 of FIG. 1. Likewise, computer device 200 may be an example any of the devices, a device within any of the distributed systems, illustrated in or referred to in any of the following figures, as discussed in greater detail below. As illustrated in FIG. 2, computing device 200 may include processing circuit 210, operating memory 220, memory controller 230, bus 240, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, and/or technology. Processing circuit 210 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, and/or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, and/or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although FIG. 2 illustrates bus 240 as a single passive bus, other configurations, such as a collection of buses, a collection of point-to-point links, an input/output controller, a bridge, other interface circuitry, and/or any collection thereof may also be suitably employed for interfacing data storage memory 250, input interface 260, output interface 270, and/or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, and/or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 5:
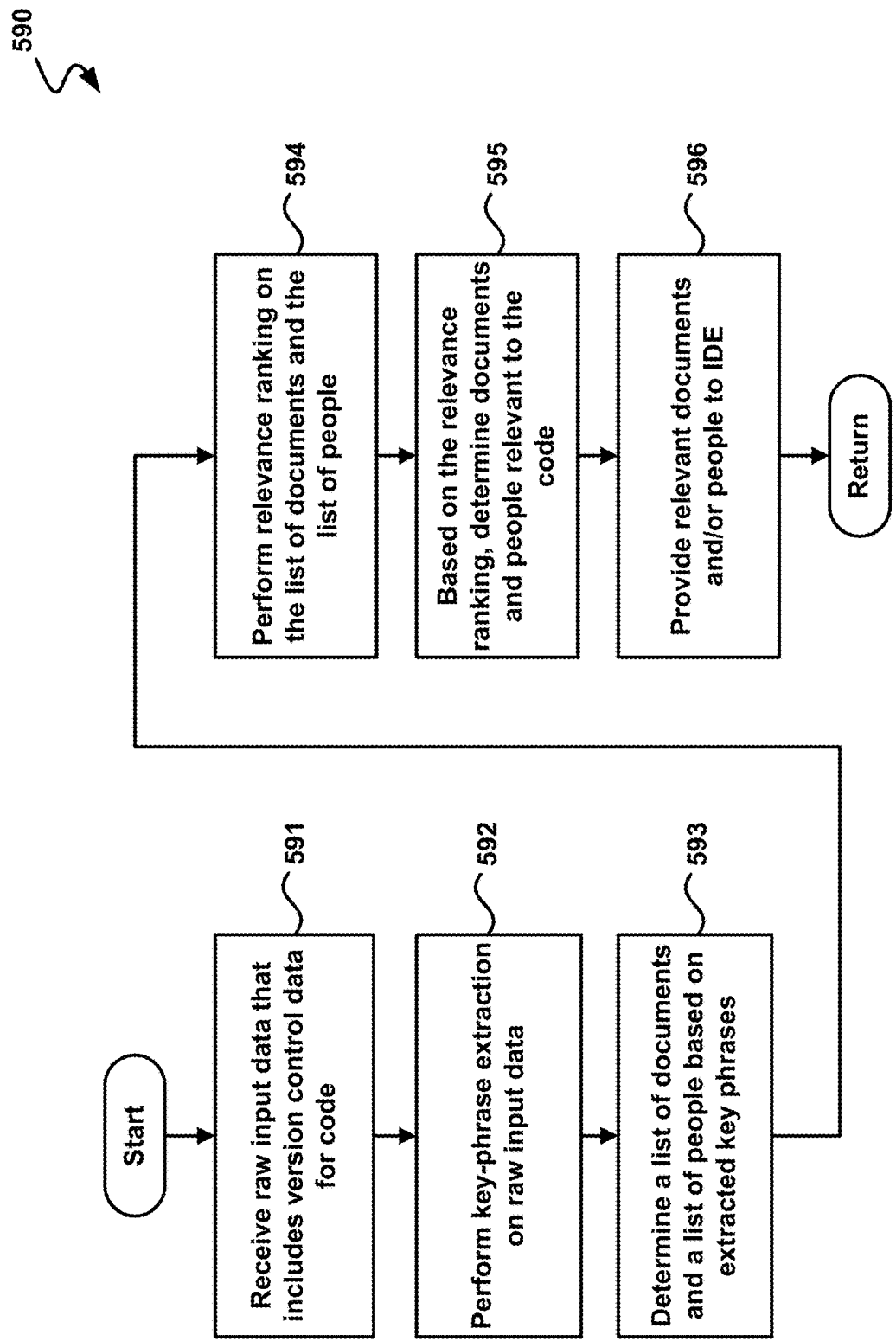
FIG. 5 is a flow diagram illustrating an example process for code contextualization, in accordance with aspects of the disclosure.

Some examples of computing device 200 include at least one memory (e.g., operating memory 220) having processor-executable code stored therein, and at least one processor (e.g., processing unit 210) that is adapted to execute the processor-executable code, wherein the processor-executable code includes processor-executable instructions that, in response to execution, enables computing device 200 to perform actions, where the actions may include, in some examples, actions for one or more processes described herein, such as the process shown in FIG. 5, as discussed in greater detail below.

Illustrative Systems

Figure 3:
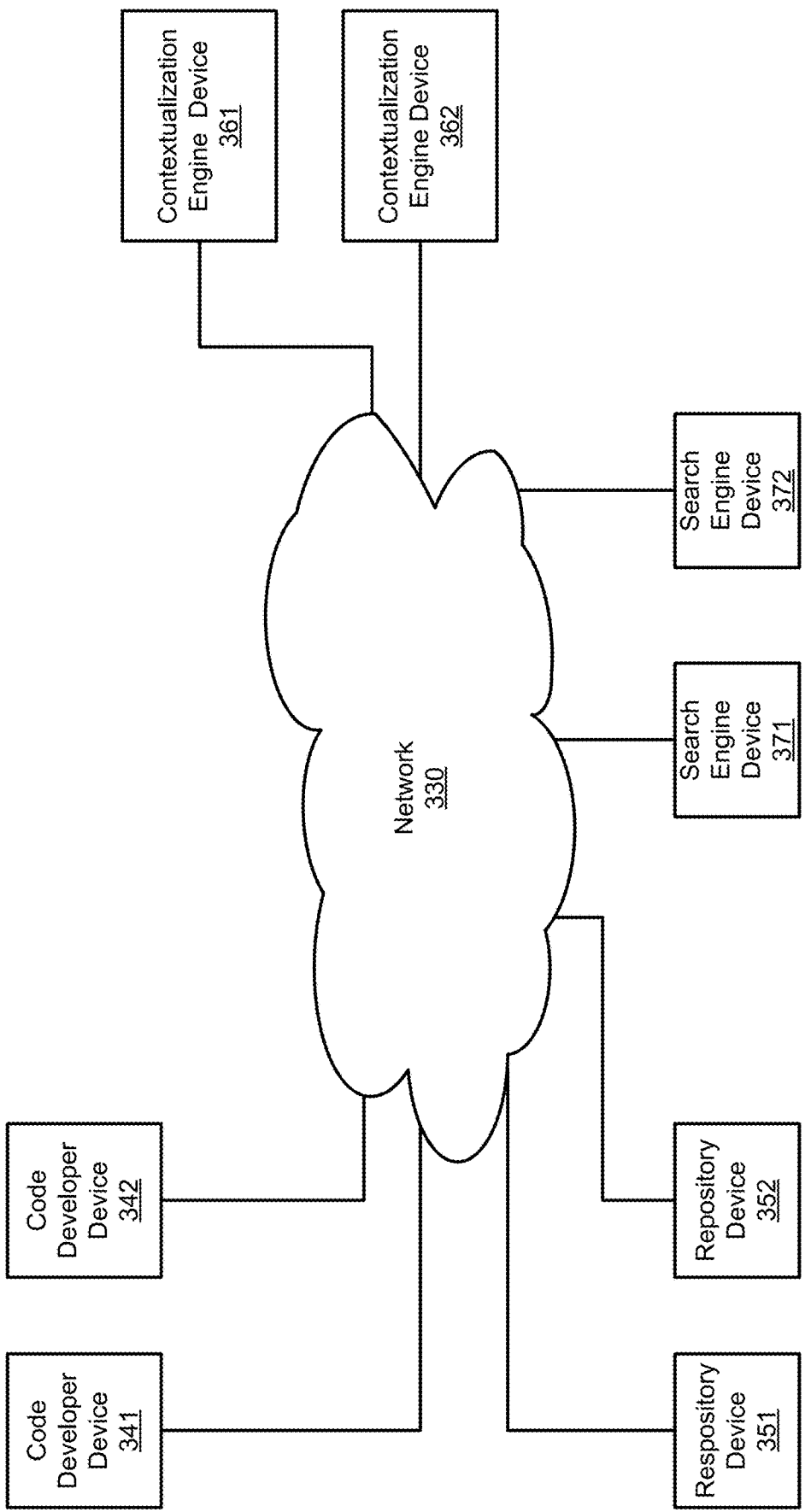
FIG. 3 is a block diagram illustrating an example of a network-connected system.

FIG. 3 is a block diagram illustrating an example of a system (300). System may include network 330, as well as code developer devices 341 and 342; repository devices 351 and 352; contextualization engine devices 361 and 362; and search engine devices 371 and 372, which, in some examples, all connect to network 330.

Each of code developer devices 341 and 342; repository devices 351 and 352; contextualization engine devices 361 and 362; and search engine devices 371 and 372 may include examples of computing device 200 of FIG. 2. FIG. 3 and the corresponding description of FIG. 3 in the specification illustrate an example system for illustrative purposes that does not limit the scope of the disclosure. Repository devices 351 and 352; contextualization engine devices 361 and 362; and search engine devices 371 and 372 may each be a part of one or more distributed systems.

In some examples, repository devices, e.g., repository devices 351 and 352, are part of one or more code repositories, such as Git repositories or the like. In some examples, code developer devices, e.g., code developer device 341 and 342, are devices that may be used by code developers to develop code. In some examples, the code developer device may execute a developer environment and communicate with one or more of the code repositories in order to facilitate the development of code. A code developer may access, review, and/or edit code on a developer environment executing on a code developer device (e.g., 341 or 342).

Search engine devices 371 and 372 may be part of one or more search engine that index information internal to one or more organizations to which the code developers belong. Contextualization engine devices 361 and 362 may be part of one or more contextualization engines that may receive version control information associated with code in order to determine people and/or documents that are relevant to the code. In some examples, contextualization engine devices 361 and 362 may make use of one or more of the search engines in order to determine the relevant people and/or documents.

One or more contextualization engines may each communicate the people and/or documents relevant to particular code to the developer environment that is associated with the code. When a code developer, via a code developer device, views a portion of code using the developer environment, the developer environment may provide the code developer with contextualization information that is associated with the code, where the contextualization information may include people and/or documents relevant to the portion of the code that is being viewed.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 may include any suitable network-based communication method by which information may travel among code developer devices 341 and 342; repository devices 351 and 352; contextualization engine devices 361 and 362; and search engine devices 371 and 372. Although each device is shown connected as connected to network 330, that does not necessarily mean that each device communicates with each other device shown. In some examples, some devices shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown instead communicating with each other with a different network of the multiple networks.

System 300 may include more or less devices than illustrated in FIG. 3, which is shown by way of example only.

Figure 4:
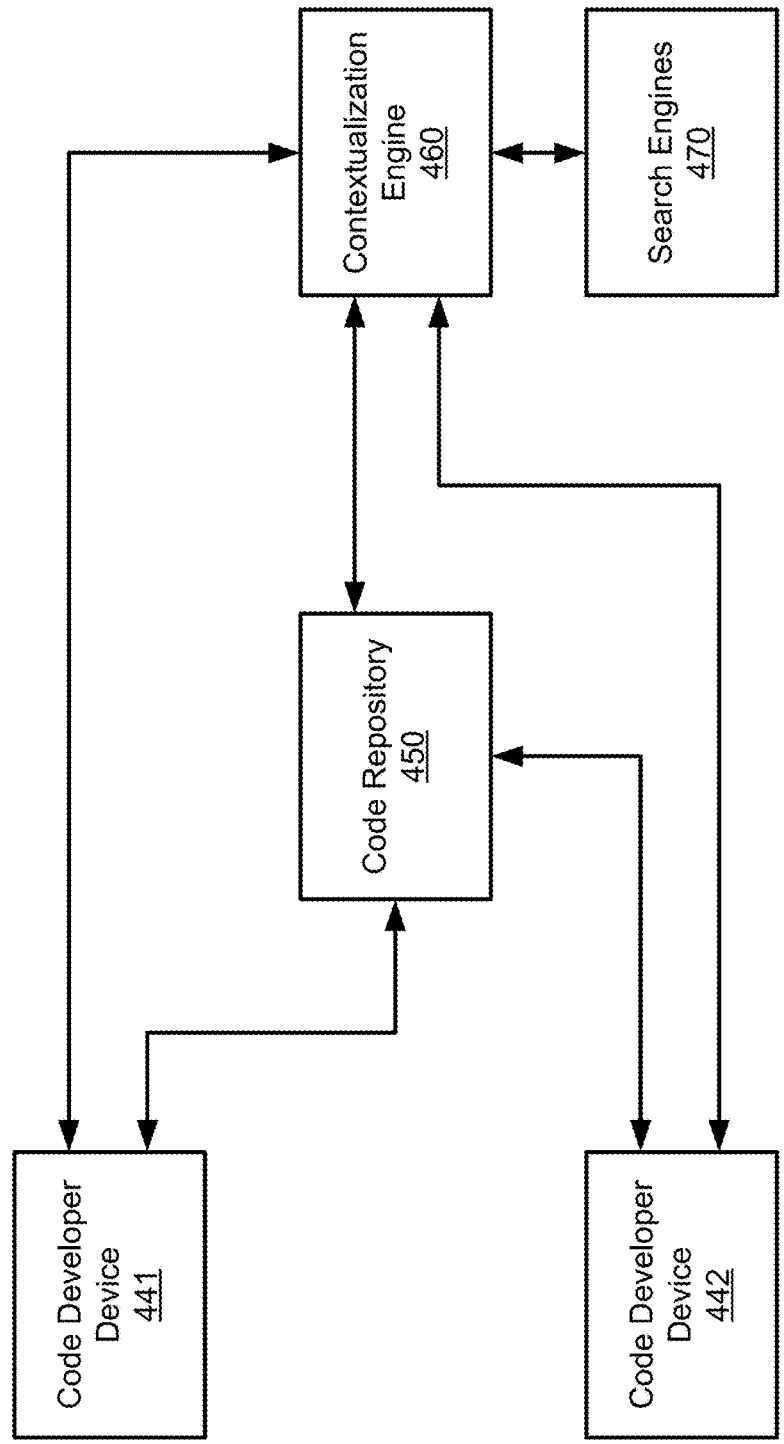
FIG. 4 is a block diagram illustrating an example of a system for code contextualization.

FIG. 4 is a block diagram illustrating an example of a system (400). System 400 may be an example of a portion of system 300 of FIG. 3. System 400 may be a system for code contextualization. System 400 may include code developer device 441, code developer device 442, code repository 450, contextualization engine 460, and search engines 470. Code developer devices 441 and 442 may be examples of code developer devices 341 and 342 of FIG. 2.

In some examples, code repository 450, contextualization engine 460, and search engines 470 each include one or more devices. In some examples, one or more of code repository 450, contextualization engine 460, and/or search engines 470 includes one or more distributed systems. In some examples, code repository 450 may include one or more devices that include examples of repository devices 351 and 352. In some examples, contextualization engine 460 may include devices that include examples of contextualization engine devices 361 and 362 of FIG. 3. In some examples, search engines 470 may include devices that include examples of search engine devices 371 and 372 of FIG. 3.

A code developer device (e.g., 441 or 442) may be operated by an individual or entity interested in developing code. In some cases, such an individual may be a contributor or programmer of code. In other cases, a user of a code developer device may be a software engineer, a programmer, a tester, a program manager, project manager, visual designer, other designer, or any individual viewing or contributing to code or aspects associated with the code in some way.

Code repository 450 may be used to store code and for version control of the code. In some examples, code repository 450 may be a Git repository or other suitable code repository. A code developer may communicate with code repository 450 via a code developer device to access code stored in code repository 450. A code developer device may be used to view or edit the accessed code via a developer environment executing on the code developer device. In some examples, the developer environment is an IDE. The developer environment may provide a code developer with contextualization information via the code developer device when a portion of code is being viewed via the developer environment.

The contextualization information may include various contextualization information for the portion of code that is being viewed via the developer environment. In some examples, the contextual information is provided to the user of the developer device by displaying a profile card that displays the contextualization information on a portion of the screen. A profile card may be presented as integrated with a window in which code is being presented on a display screen or presented as a window separate from the window presenting the code. In some examples, the profile card may be presented concurrently with the code.

The contextualization information may be provided in other suitable ways in other examples. The profile card may also include other information, such as including the user's name, a profile image, office location, email address, phone number, job title, office location, and/or the like. The profile card may also include organizational data, which may include organization directory, structure, and/or the like. The profile card may also include conversation data, which may include various messages associated with conversations or instant messages. Various types of information may be included in different portions of the profile card.

The contextualization information may include various contextual information associated with the portion of code being viewed, such as designated response data, repository data, pull request data, push/pull command data, code modification data, visual work item data, and/or the like. The code modification information may include latest changes data and edit history data. The edit data history in the code modification information may include data indicating edit history associated with code or a code segment. Further, the edit history data may convey any type of edits and any number of edits, and/or links to the edits. Edit history data may also include a date/time associated with an edit, and/or the like. The edit data history may include various types of information associated with edit history data, such as, for example, a link to a previous modification, a date/time associated with a previous modification, a brief overview or summary of the previous modification, and/or the like.

The contextual information may include visual work item data. The visual work item data may include one or more works items having a visual representation, including, for example, cards or tickets on Kanban boards. The contextualization information may also include repository data associated with code repository 450. The repository data may include, for example, links to repositories, descriptions or summaries of repositories, metadata associated with repositories, time/date associated with repository access, modifications, contributions, build status (e.g., build succeeded, build failed, build in progress), and/or the like.

The contextualization information may also include pull command data and push command data. The pull command data may include data associated with pull commands, and the push command data may include data associated with push commands. In some cases, local repositories, such as a local repository at a code developer device, can be synchronized with code repository 450, enabling code developers to synchronize changes with other code developers. In some examples, such a synchronization can be performed using push and/or pull commands. A push command may be used to push commits that are associated with a current local repository to code repository 450 to a main branch, or some other development branch.

The main branch may be used to hold the stable production code, with feature work or other work being done in separate branches. The other branches may be reviewed at points in time for possible merging into the main branch through a pull request process. After a pull request is completed, changes may be recorded in a change log that holds metadata that includes information about the changes. The metadata may include author information, date, time, a descriptive commit message, and other suitable information. On a main branch, the commit message may include the pull request description.

For example, a push command can be used to push all commits of a local repository that belong to a master branch of code repository 450. A pull command may be used to fetch the content or commits from a main branch or some other development branch of code repository 450 and store them in a local repository. Accordingly, to prevent a local copy of a repository from becoming stale, a pull command may be used to re-synchronize the local copy of the repository with code repository 450.

The contextualization information may also include pull request data. The pull request data may include data associated with pull requests. One example of a pull request is a collection of code changes that the code developer requests to merge into a main branch. The pull request may provide code changes in the form of a tree of folders or files indicating changes or modifications to the code. A code developer may use a pull request to change the code in an existing branch, to merge a branch, or to create a new branch. For example, a code developer may create a new local branch at a local computing device to create a new feature.

The code developer may then develop and then use a pull request to commit changes to the local branch and push the local branch to create a copy on code repository 450. Next, the developer may create a pull request to merge the changes from the new branch to the master branch. For instance, when viewing branches in the developer environment, a code developer may be prompted to create a pull request for a new branch into a master branch. In some cases, reviewers and/or the code developer may discuss changes, push new commits to create an update to the pull request, and/or the like. In some examples, completing the pull request merges the changes into the master branch.

The pull request data may include a list of pull requests associated with the portion of code being viewed. For each pull request, the contextualization information may include a time associated with the pull request, a brief overview of the pull request, and a link to the pull request that the code developer may use to view the full pull request. Each of the pull requests may include one or more commit messages. A pull request or commit message may include various types of data, such as a type of commit, a scope of commit, a subject, a body or description section that may include detailed information including an indication or explanation of changes made and reasons for the change, a footer indicating issues affected by the code changes or comments to another developer, comments, and/or the like. In some examples, issues affected by the code changes or comments to another developer may be included in the description section rather than in a footer.

In some examples, the provided contextual information can dynamically adapt to align with information determined as desired by the code developer and/or in real-time to the code developer. As such, in these examples, a code developer can view desired and up-to-date information and can seamlessly assess the information. In some examples, the developer environment may be in continuous communication with code repository 450 and continually monitor information provided by code repository 450 for updated information. In other examples, the developer environment instead periodically polls code repository 450 for new information. In some examples, the developer environment may access or make a call to a service that monitors or provides pull/push commands and/or pull requests in association with code repository 450.

Based on the particular code developer, a set of pull requests initiated by the particular code developer may be identified by communicating with a remote service that monitors access to code repository 450. In some examples, access to code repository 450 may be monitored via an Open Supervised Device Protocol (OSDP) or other protocol enabling communication over a network. For example, the pull request data may be associated with the particular code being viewed by the code developer and/or a particular code segment selected by the code developer, and included among the contextual information provided when the code segment is viewed in the developer environment.

In some examples, the developer environment may determine an amount or extent of contextual information to provide when a portion of code is being viewed in the developer environment. For example, for a particular type of contextual information, a predetermined number of data points, or the like, may be determined. For instance, in some examples, the developer environment may determine a top five pull requests or a five most recent pull requests. Such a determination may be based on user preferences, user attributes, default settings, logic, obtained contextual indicators, and/or the like. Similarly, in some examples, the provided contextualization information may include a particular number of repository accesses, a particular number of visual work items, or the like, that are determined to be most relevant among the total number of repository accesses and visual work items. The determination may be based on user preferences, a user viewing the data, a size of display screen on which the card is being presented, a proportion of data identified (e.g., 10% of identified contextual data for a particular type of contextual data), a historical viewing or access of data by the user viewing the data, a recency of data (e.g., data associated with the last week, a predetermined number of most recent data), and/or other suitable criteria.

The contextualization information may also include people and/or documents that are relevant to the portion of code being viewed. In some examples, relevancy to the portion of code being viewed includes relevancy to changes made to the code being viewed. For example, the contextualization information may include people that contributed to the code or contributed to document associated with the code including product manager and designers. The relevant people may also include a product manager who made the specification document, people who in some way engrain knowledge used to develop the code, and/or other suitable people.

The relevant documents may include specification documents made by product managers, design files created by designers, and/or other suitable documents. The code developer may then be able to view the relevant documents and communicate with relevant people via an interface that is included in the developer environment while the code developer is viewing the code portion in the developer environment. The relevant documents may include a variety of different of files, including visual design files and the like. In some examples, the contextualization information may also have the relevant people ranked by relevancy, and the relevant documents ranked by relevancy.

For instance, in some examples, the profile card may include, for each person relevant to the code portion, an image that shows a picture of the person and/or the name of the person, displayed in an order based on their ranked relevancy. In some examples, for each person, a brief description of the manner in which the person contributed to the code may also be included. For instance, in some examples, for each relevant person, the person may be identified as the "commit author," as the "designated response individual," or be included in a list of "other contributors." Other suitable categories may be used in other examples.

The profile card may include other information about one or more of the relevant people, such as job title or other suitable information. In some examples, the code developer is able to use the profile card to communicate with one of the relevant people in some examples. For instance, in some examples, a code developer is able to click on the name and/or image of the person to communicate with that person, such as via a chat application or the like. In some examples, for the commit author, a box for text entry may be provided in the profile card that is usable to easily send a quick message to the commit author.

In some examples, for each document relevant to the portion of code being viewed, the profile card may include an icon that includes information about the document such as the name of the document, a brief description of the document, and/or a link to the document. The document icons may be displayed on the profile in an order that is based on their ranked relevancy.

In some examples, the profile card may include only a particular number of the most relevant people and the most relevant documents, but may have a control that can be selected to show all of the relevant people and/or a control that can be selected to show all of the relevant documents. Likewise, in some examples, the profile card may not show all of the available contextualization data associated with the code portion, but may include one or more controls that, if selected, display more of the available contextualization data. In some examples, the profile card may include both relevant people and relevant documents. In other examples, the profile card may include relevant people but not documents, or relevant documents but not people.

Some of the contextualization information may be provided by code repository 450, including version control information for the code from code repository 450 and/or other suitable information from code repository 450 that is associated with the code. Some of the contextualization information may be provided by contextualization engine 460, where contextualization engine 460 may determine some of the information based on version control information for the code received from code repository 450.

Contextualization engine 460 may determine the relevant people and documents for each code portion, and provide the relevant people and documents to the developer environment. Contextualization engine 460 may determine the relevant people and documents as follows. First, contextualization engine 460 may receive raw input data from code repository 450. The raw input data may include version control data for the code, including each of the pull requests that is associated with the code. The pull requests in the version control data may include commit messages and pull request descriptions. In some examples, contextualization engine 460 uses URL extraction to determine documents that were linked in the pull requests, such as documents linked to in the commit messages, or in the description section of the pull request or other portion of the pull request. In some examples, documents retrieved by URL extraction that lack any key phrases may be excluded. The URL extraction maybe performed with a regular expression or through another suitable method.

In some examples, contextualization engine 460 uses key-phrase extraction extract key phrases from the version control data. The key-phrase extraction may be accomplished by stop-word removal, machine-learning techniques, and/or other suitable methods. In some examples, the key-phrase extraction is performed on all of the version control data, including commit messages and pull request descriptions in the version control data. Contextualization engine 460 may then use the extracted key phrases as input terms for one or more search engines of search engines 470. The search engines may then output, as search results, documents and/or people based on the input terms. For instance, one of the search engines may be a search engine that indexes all internal documents associated with the business, organization, or other entity of which the code developer is a member. In some examples, one of the search engines index groups of files and people by topics. In some examples, the determination of relevant documents based on URL extraction and the determination of relevant documents and/or people from key-phrase extraction using the extracted key phrases as input terms to search engines 470 may be performed in parallel with each other.

Contextualization engine 460 may use the documents retrieved as outputs of search engines 470 and the URL extraction to determine people that are associated with those documents, such as authors of the documents, editors of the documents, other contributors to the documents, and/or the like. In some examples, people relevant to the documents may be determined based on the metadata for the documents, or in other suitable ways. For example, the metadata for a document may include information related to the author of the document, which people have edited the document, which people have commented on the document, and/or the like. In some examples, the content of the document may also be used to determine people associated with the document.

Contextualization engine 460 may then use a relevancy ranker to rank the relevancy of the people and documents output. Various suitable factors may be used to determine the relevancy. For instance, in some examples, in the relevancy ranking of people, the number of documents contributed to by a person may be a factor in the ranking of the relevancy of the person. In some examples, in the relevancy ranking of the documents, the number of key phrases present in a document is a factor in the ranking of the document, and the level of relevancy and/or descriptiveness of each key phrase present in the document is a factor in the ranking of the document. The relevancy of the people that contributed to a document may be a factor in the ranking of the document.

Contextualization engine 460 may then determine, based on the relevancy rankings of the people and documents, which people and documents are relevant to the portion of code. In some examples, the relevant people are provided in a ranked list of people, and the relevant documents are provided in a ranked list of documents. In some examples, contextualization engine 460 may also use additional iterations to determine additional relevant people and documents, as follows.

In some examples, in the additional iterations, the process discussed above prior to the additional iterations are essentially repeated, except this time using the determined people and documents as the raw input data rather than using the version control data for the code as the raw input data. Contextualization engine 460 may determine additional relevant people and documents from this raw input data as follows. In some examples, with regard to the relevant people, documents associated with the relevant people may be determined. In some examples, contextualization engine 460 uses URL extraction to determine documents that were linked in the raw input data.

During the additional iterations, contextualization engine 460 may use key-phrase extraction to extract key phrases from the raw input data. Contextualization engine 460 may then use the extracted key phrases as input terms for one or more search engines of search engines 470. The search engines may then output documents and/or people based on the input terms. In some examples, the determination of relevant documents based on URL extraction and the determination of relevant documents and/or people from key-phrase extraction using the extracted key phrases as input terms to search engines 470 may be performed in parallel. Contextualization engine 460 may use the documents retrieved as outputs of search engines 470 and the URL extraction to determine people that are associated with those documents.

Contextualization engine 460 may then use a relevancy ranker to rank the relevancy of the people and documents output. Contextualization engine 460 may then determine, based on the relevancy rankings of the people and documents, which people and documents are relevant to the portion of code. In some examples, contextualization engine 460 may use additional iterations to determine additional relevant people and documents, using the newly determined relevant people and documents for each new iteration, until an iteration no longer determines new relevant people and documents, or until an iteration is below a determined threshold for relevancy. In some examples, after all of the relevant people and documents are determined after all of the iterations are performed, relevancy is determined among each of the people and each of the documents, and a ranked list of each of the relevant people is provided and a ranked list of each of the relevant documents is provided.

Although some examples of contextualization engine 460 perform multiple additional iterations, as discussed above, in some examples, exactly one additional iteration is performed, and in some examples, no additional iterations are performed and only the initial list of people and documents determined based on the version control data as raw input data is provided.

Contextualization engine 460 may then communicate the relevant people and document to the developer environment, where the developer environment may include the relevant people and documents among the contextualization information, as discussed in greater detail above. In some examples, contextualization engine 460 may communicate to the developer environment both relevant people and relevant documents. In other examples, contextualization engine 460 may communicate to the developer environment relevant people but not documents, or relevant documents but not people.

Illustrative Process

FIG. 5 is a diagram illustrating an example dataflow for a process (590) for code contextualization. In some examples, process 590 may be performed by an example of one of the contextualization engine devices 361 and/or 362 of FIG. 3, by an example of contextualization engine 460 of FIG. 4, by an example of device 200 of FIG. 2, or the like.

In the illustrated example, step 591 occurs first. At step 591, in some examples, raw input data that includes version information that is associated with code is received. In some examples, the version information includes a plurality of pull requests associated with the code. As shown, step 592 occurs next in some examples. At step 592, in some examples, a plurality of extracted key phrases is provided by performing a key-phrase extraction on the raw input data. As shown, step 593 occurs next in some examples. At step 593, in some examples, a list of documents and a list of people are determined based at least in part on the plurality of extracted key phrases.

As shown, step 594 occurs next in some examples. At step 594, in some examples, a relevance ranking is performed on the list of documents and the list of people. As shown, step 595 occurs next in some examples. At step 595, in some examples, based on the relevance ranking, a plurality of relevant documents and a plurality of relevant people are determined, such that plurality of relevant documents and the plurality of relevant people are relevant to the code. As shown, step 596 occurs next in some examples. At step 596, in some examples, to a developer environment that is associated with the code, information associated with at least one of the plurality of relevant documents or the plurality of relevant people is provided. The process may then advance to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
   a computing device including at least one memory having processor-executable code stored therein, and
   at least one processor that is configured to execute the processor-executable code, wherein the processor-executable code includes processor-executable instructions that, in response to execution, enable the computing device to perform actions, including:
   receiving, at a contextualization device, raw input data that includes version information that is associated with particular code, wherein the version information includes a plurality of pull requests associated with the particular code;
   performing, via the contextualization device, a key-phrase extraction on the raw input data to provide a plurality of extracted key phrases;
   identifying, via the contextualization device, a list of documents and a list of people based at least in part on the plurality of extracted key phrases;
   performing, via the contextualization device, a relevance ranking on the list of documents and the list of people;
   based on the relevance ranking, identifying a plurality of documents relevant to the code and a plurality of people relevant to the particular code;
   executing a developer environment on a code developer device used by a code developer to view the particular code;
   providing, to the code developer device involved in the execution of the developer environment associated with the particular code, information associated with at least one of the plurality of documents relevant to the particular code or the plurality of people relevant to the particular code, wherein the developer environment provides the information associated with the at least one of the plurality of documents relevant to the particular code or the plurality of people relevant to the particular code to the code developer when the code developer views the particular code; and
   communicating with one or more code repositories in order to facilitate development of code, during runtime, the computing device further configured for:

identifying additional relevant people and additional relevant documents based on an iterative process that includes, at a first additional iteration:
  providing a plurality of extracted key phrases of the first additional iteration by performing a key-phrase extraction on the additional relevant documents;
  identifying additional documents of the first additional iteration and additional people of the first additional iteration based at least in part on the plurality of extracted key phrases of the first additional iteration;
  performing a relevance ranking on the additional documents of the first additional iteration and the additional people of the first additional iteration; and
  based on the relevance ranking of the first additional iteration, identifying additional relevant people and additional relevant documents, such that the additional relevant documents and the additional relevant people are relevant to the particular code.

2. The apparatus of claim 1, the actions further including:
  providing extracted data by performing a uniform resource location (URL) extraction on the raw input data, wherein identifying the list of documents and the list of people is further based on the extracted data.

3. The apparatus of claim 1, the actions further including:
  obtaining search results by using extracted key phrases of the plurality of extracted key phrases as inputs to at least one search engine, wherein identifying the list of documents and the list of people is based at least in part on the search results.

4. The apparatus of claim 1, wherein the key-phrase extraction includes at least one of stop-word removal or a machine-learning technique.

5. The apparatus of claim 1, wherein the relevant documents include a specification file that is associated with the particular code.

6. The apparatus of claim 1, wherein the relevant documents include a visual design file that is associated with the particular code.

7. The apparatus of claim 1, wherein identifying the additional relevant people and the additional relevant documents based on the iterative process further includes:
  performing a plurality of additional iterations beyond the first additional iteration until relevancy of the additional relevant people and the additional relevant documents are below a threshold, wherein, for each iteration of the additional iterations beyond the additional first iteration, performing that iteration includes:
    providing a plurality of extracted key phrases of the iteration by performing a key-phrase extraction on the additional relevant documents identified on a previous iteration;
    identifying additional documents of the iteration and additional people of the iteration based at least in part on the plurality of extracted key phrases of the iteration;
    performing a relevance ranking on the additional documents of the iteration and the additional people of the iteration; and
    based on the relevance ranking of the iteration, identifying additional relevant people and additional relevant documents, such that the additional relevant documents and the additional relevant people are relevant to the particular code.

8. The apparatus of claim 7, wherein the actions further including, for each additional iteration, performing URL extraction on relevant documents identified on the previous iteration.

9. A computer-implemented method, comprising:
  providing, via a contextualization device, extracted key phrases by performing a key-phrase extraction on version control data that is associated with particular code, wherein the version control data includes a plurality of pull requests associated with the particular code;
  via at least one processor, identifying a list of files and a list of people based at least in part on the extracted key phrases;
  ranking files in the list of files by relevance to the particular code;
  ranking people in the list of people by relevance to the particular code;
  based on the ranking of the files and the ranking of the people, outputting, via the contextualization device, a plurality of files relevant to the particular code and a plurality of people relevant to the particular code;
  executing a developer environment on a code developer device used by a code developer to view the particular code;
  communicating, to the code developer device involved in execution of a developer environment associated with the particular code, information that is associated with at least one of the plurality of files relevant to the particular code or the plurality of people relevant to the particular code, wherein the developer environment provides the information that is associated with the at least one of the plurality of files relevant to the particular code or the plurality of people relevant to the particular code to the code developer when the code developer views the particular code;
  communicating with one or more code repositories to facilitate development of code, during run-time;
  identifying additional relevant people and additional relevant documents based on an iterative process including:
  performing a plurality of additional iterations beyond a first additional iteration until relevancy of the additional relevant people and the additional relevant documents are below a threshold, wherein, for each iteration of the additional iterations beyond a first iteration, performing that iteration includes:
    providing a plurality of extracted key phrases of the iteration by performing a key-phrase extraction on the additional relevant documents identified on a previous iteration;
    identifying additional relevant documents of the iteration and additional people of the iteration based at least in part on the plurality of extracted key phrases of the iteration;
    performing a relevance ranking on the additional documents of the iteration and the additional people of the iteration; and
    based on the relevance ranking of the iteration, identifying additional relevant people and additional relevant documents, such that the additional relevant documents and the additional relevant people are relevant to the particular code.

10. The method of claim 9, further comprising:
  providing extracted data by performing a uniform resource location (URL) extraction on the version control data, wherein identifying the list of files and the list of people is further based on the extracted data.

11. The method of claim 9, further comprising:
  obtaining search results by using the extracted key phrases as inputs to at least one search engine, wherein identifying the list of files and the list of people is based at least in part on the search results.

12. The method of claim 9, wherein identifying the additional relevant people and the additional relevant documents based on the iterative process includes:
at the first additional iteration:
providing a plurality of extracted key phrases of the first additional iteration by performing a key-phrase extraction on the relevant documents;
determining additional files of the first additional iteration and additional people of the first additional iteration based at least in part on the plurality of extracted key phrases of the first additional iteration;
performing a relevance ranking on the additional files of the first additional iteration and the additional people of the first additional iteration; and
based on the relevance ranking of the first additional iteration, identifying additional relevant people and additional relevant files, such that the additional relevant files and the additional relevant people are relevant to the particular code.

13. A processor-readable storage medium, having stored thereon processor-executable code that, upon execution by at least one processor, enables actions, comprising:
receiving, via a contextualization device, raw input data that includes a plurality of pull requests associated with particular code;
performing, via the contextualization device, key-phrase extraction on the raw input data to provide a plurality of extracted key phrases;
providing a list of documents and a list of people based at least in part on the plurality of extracted key phrases;
performing, via the contextualization device, a relevance ranking on the list of documents and the list of people;
based on the relevance ranking, identifying a plurality of documents relevant to the particular code and a plurality of people relevant to the particular code;
executing a developer environment on a code developer device used by a code developer to view the particular code;
outputting information associated with at least one of the plurality of documents relevant to the particular code or the plurality of people relevant to the particular code to the developer environment, the developer environment being executed on the code developer device used by a code developer to view the particular code, wherein the developer environment provides the information associated with the at least one of the plurality of documents relevant to the particular code or the plurality of people relevant to the particular code to the code developer when the code developer views the particular code;
communicating with one or more code repositories to facilitate development of code, during run-time;
identifying additional relevant people and additional relevant documents based on an iterative process that includes, at a first additional iteration:
providing a plurality of extracted key phrases of the first additional iteration by performing a key-phrase extraction on the additional relevant documents;
identifying additional documents of the first additional iteration and additional people of the first additional iteration based at least in part on the plurality of extracted key phrases of the first additional iteration;
performing a relevance ranking on the additional documents of the first additional iteration and the additional people of the first additional iteration; and
based on the relevance ranking of the first additional iteration, identifying additional relevant people and additional relevant documents, such that the additional relevant documents and the additional relevant people are relevant to the particular code.

14. The processor-readable storage medium of claim 13, the actions further comprising:
providing extracted data by performing a uniform resource location (URL) extraction on the raw input data, wherein providing the list of documents and the list of people is further based on the extracted data.

15. The processor-readable storage medium of claim 13, the actions further comprising:
obtaining search results by using extracted key phrases of the plurality of extracted key phrases as inputs to at least one search engine, wherein identifying the list of documents and the list of people is based at least in part on the search results.

* * * * *